(12) United States Patent
Takashima

(10) Patent No.: US 7,747,385 B2
(45) Date of Patent: Jun. 29, 2010

(54) TRAVELING CONDITION DETERMINATION DEVICE

(75) Inventor: Ryo Takashima, Toyota (JP)

(73) Assignee: DENSO CORPORATION, Kariya (JP)

( * ) Notice: Subject to any disclaimer, the term of this patent is extended or adjusted under 35 U.S.C. 154(b) by 550 days.

(21) Appl. No.: 11/447,016

(22) Filed: Jun. 6, 2006

(65) Prior Publication Data

US 2006/0287812 A1 Dec. 21, 2006

(30) Foreign Application Priority Data

Jun. 17, 2005 (JP) .............................. 2005-178349

(51) Int. Cl.
*G01C 21/26* (2006.01)
(52) U.S. Cl. .................. 701/223; 701/28; 701/205; 701/207; 701/208; 180/167; 180/168; 180/169
(58) Field of Classification Search ................. 701/200, 701/211, 205, 206, 207, 223, 23, 28; 180/168, 180/169, 167; 356/141.1
See application file for complete search history.

(56) References Cited

U.S. PATENT DOCUMENTS

| | | | | |
|---|---|---|---|---|
| 4,786,164 A | * | 11/1988 | Kawata | 356/5.05 |
| 5,072,396 A | * | 12/1991 | Fitzpatrick et al. | 701/217 |
| 5,285,391 A | * | 2/1994 | Smith et al. | 701/200 |
| 5,345,388 A | * | 9/1994 | Kashiwazaki | 701/213 |
| 5,390,118 A | * | 2/1995 | Margolis et al. | 701/23 |
| 5,844,505 A | * | 12/1998 | Van Ryzin | 340/988 |
| 6,169,940 B1 | * | 1/2001 | Jitsukata et al. | 701/23 |
| 6,503,170 B1 | * | 1/2003 | Tabata | 477/97 |
| 6,707,054 B2 | * | 3/2004 | Ray | 250/559.38 |
| 6,718,241 B2 | | 4/2004 | Kondo et al. | |
| 7,103,475 B2 | * | 9/2006 | Irie | 701/211 |

FOREIGN PATENT DOCUMENTS

| | | | |
|---|---|---|---|
| JP | 06074778 | * | 3/1994 |
| JP | 06074778 A | * | 3/1994 |
| JP | A-6-74778 | | 3/1994 |
| JP | 08254432 A | * | 1/1996 |
| JP | 08254432 A | * | 10/1996 |
| JP | A-8-254432 | | 10/1996 |
| JP | A-2003-227725 | | 8/2003 |
| JP | 2004123059 A | * | 4/2004 |
| JP | 2004123059 A | * | 4/2004 |

OTHER PUBLICATIONS

Yano, Translation of JP 06-074778, Mar. 1994.*
Shape table functions, 2004, Environmental Systems Research Institute, Inc., ArcSDE 9.0.*

* cited by examiner

*Primary Examiner*—Khoi Tran
*Assistant Examiner*—Spencer Patton
(74) *Attorney, Agent, or Firm*—Posz Law Group, PLC

(57) ABSTRACT

A traveling condition determination device for use in a vehicle includes an imaging unit for periodically capturing an image of a road on which the vehicle is traveling, a recognition unit for recognizing a marker on a side of the road relative to the vehicle, a detection unit for detecting an angle of the vehicle relative to the marker recognized by the recognition unit, a storage unit for storing the angle of the vehicle detected by the detection unit in an analyzable manner and a determination unit for determining a traveling condition of the vehicle based on the angle stored in the storage unit.

7 Claims, 11 Drawing Sheets

TRAVELING CONDITION DETERMINATION DEVICE

CROSS REFERENCE TO RELATED APPLICATION

This application is based on and claims the benefit of priority of Japanese Patent Application No. 2005-178349 filed on June 17, the disclosure of which is incorporated herein by reference.

FIELD OF THE INVENTION

The present invention generally relates to a traveling condition determination device for a vehicle.

BACKGROUND OF THE INVENTION

A navigation system for use in a vehicle conventionally determines a current position of the vehicle based on an autonomous navigation method and a radio navigation method. The autonomous navigation method determines the current position of the vehicle by employing measurement of geomagnetism, direction and/or vehicle speed as well as map data. That is, an estimated position of the vehicle based on the measurement is adjusted and "matched" with, for example, a position of a road to be suitably displayed on a map in a display unit of the navigation system. This process is called as "Map matching." The radio navigation method determines the current position of the vehicle by employing radio signals received from plural satellites for map matching. Some of the currently available navigation systems use both of the autonomous navigation method and the radio navigation method for accurately determining the current position of the vehicle.

The navigation system in a disclosure of the Japanese Patent Document JP-A-2003-227725 uses a camera disposed on a vehicle for capturing image of a road and precisely determining a type of the road, that is, a local road, an expressway or the like.

However, the navigation system of the above-described type is not capable of determining a traveling condition of the vehicle at a specific moment such as going into an intersection, going into a parking lot by leaving a local road or the like.

SUMMARY OF THE INVENTION

In view of the above-described and other problems, the present disclosure provides a traveling condition determination device for a vehicle that precisely determines a traveling condition of the vehicle. The traveling condition determination device is used with a navigation system for accurately providing navigation instructions for a user of the vehicle.

The traveling condition determination device for use in the vehicle includes an imaging unit for periodically capturing an image of a road on which the vehicle is traveling, a recognition unit for recognizing a marker on a side of the road relative to the vehicle, a detection unit for detecting an angle of the vehicle against the marker recognized by the recognition unit, a storage unit for storing the angle of the vehicle detected by the detection unit in an analyzable manner and a determination unit for determining a traveling condition of the vehicle based on the angle stored in the storage unit.

The traveling condition of the vehicle is detected and determined based on, for example, an angle of the vehicle against a white line (a road side marker) on both sides of the road. That is, when the vehicle travels along the road without turning a corner nor crossing an intersection, the road side markers and a vehicle body run substantially in parallel. On the other hand, the road side markers and the vehicle body run in an angle when the vehicle makes a turn in the intersection or into a parking lot on the roadside. Therefore, the traveling condition of the vehicle is precisely determined by measuring and analyzing the angle between the vehicle body and the road side markers over a predetermined period of time.

In another aspect of the disclosure, the traveling condition determination device uses a transition of a body angle of the vehicle against the markers for determining the traveling condition. The transition, or a changing pattern, of the body angle relative to the marker is stored in the storage unit, or a memory, as traveling patterns of the vehicle, and detected body angle is matched with those patterns for traveling condition determination. The measurement of the body angle is collected at a predetermined interval while the vehicle is traveling on the road, and measurement operation is suspended when the vehicle is stopping. The measurement data of the body angle stored in the memory is overwritten when the measurement data amounts to a certain volume. That is, the oldest measurement data is overwritten by a newly acquired data in a first-in first-out manner. In this manner, a useless detection and calculation of the body angle are suppressed and space of the memory in the traveling condition determination device is efficiently used.

In yet another aspect of the disclosure, the traveling condition determination device uses a predetermined pattern of the body angle transition in the memory for determining the traveling condition of the vehicle. The predetermined pattern for traveling condition determination includes a straight travel along the road, a straight passing through the intersection, and a right/left turning in the intersection. Further, the predetermined pattern is associated with the marker types. That is, for example, the solid/continuous marker is differentiated from the broken line marker in terms of determination of the vehicle traveling condition. Furthermore, each of plural lanes in the road is also differentiated for traveling condition determination. Furthermore, a graphical pattern on the road is also recognized and analyzed for traveling condition determination by the traveling condition determination device.

The traveling condition of the vehicle can be categorized into transition patterns of the body angle. The detected transition pattern is compared with stored transition pattern data in the memory for traveling condition determination. The transition pattern data is associated with attributes of marker types such as a solid line, a broken line or the like for further precision of determination. In this manner, a same transition pattern of turning can be distinguished, for example, between a turning in the intersection and a turning into a parking lot along the road. The marker type may also be employed for distinguishing a lane in the road when plural lanes exist on the road. The marker type may also be associated with a graphical sign painted on the road for detailed traveling condition determination.

In still yet another aspect of the disclosure, the traveling condition determination device changes the manner of information acquisition, that is, the interval of imaging the marker or the like on the road based on the traveling condition of the vehicle or an attribute of the road. The traveling condition may include conditions such as vehicle speed, steering angle or the like, and the attribute of the road may include a road description that the road is straight and has few intersections or the like. In this case, the vehicle on the straight road may allow the traveling condition determination device to determine the traveling condition at a longer interval for lightening processing load on the memory or a CPU, and the vehicle on a curvy road at a low speed may demand the traveling condition determination at a shorter interval for improved precision of determination.

In still yet another aspect of the disclosure, the traveling condition determination device is used in combination with a navigation system for an improved accuracy of map matching in a navigation process. Employment of the traveling condition in the map matching leads to an improvement of the accuracy of the map matching process based on the autonomous navigation method and/or the radio navigation method.

In still yet another aspect of the disclosure, the traveling condition determination device is involved in displaying a location of the vehicle on a display unit of navigation system based on the map matching process. In this manner, the user of the navigation system can easily understand the vehicle location in map. The map matching process may be in synchronization with the determination of the traveling condition by the traveling condition determination device for updating the vehicle location in a timely manner. Further, the location of the vehicle that is approaching an intersection may be employed for determining the traveling condition, because detailed instruction from the navigation system may be required for the user in the vehicle in the proximity of the intersection. Furthermore, an intersection specific map matching is executed based on the traveling condition determined by the determination device. That is, straight passing and right/left turning condition in the intersection may be detected and used for matching the vehicle location in the intersection on the map. Furthermore, the matching process is stopped when the vehicle is traveling outside of the road. In this manner, false map matching for the vehicle traveling in, for example, a parking lot is prevented. Furthermore, the traveling condition determined by the determination device may be displayed on the display unit by using an illustrative graphic for clarity of communication between the user and the navigation system.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Embodiments of the present invention are described with reference to the drawings. Like parts have like numbers in each of the embodiments. In addition, the description of the embodiments of the present invention takes the left side traffic as an example. However, the present invention is applicable to the right side traffic by reversing the traffic directions.

A traveling condition determination device of the present disclosure is described as a function of a navigation system in a vehicle.

Figure 1:
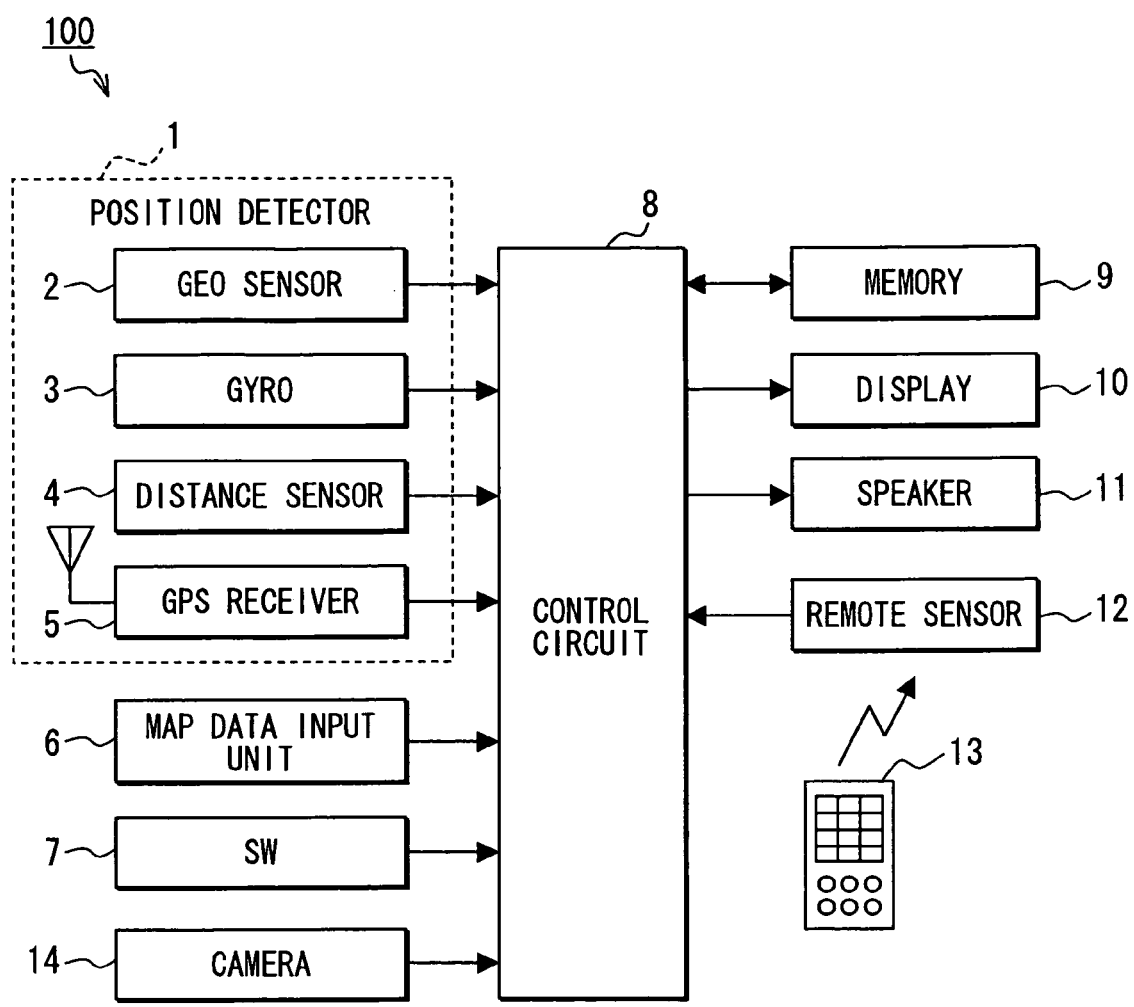
FIG. 1 shows a block diagram of a car navigation system in an embodiment of the present invention.

FIG. 1 shows a block diagram of a car navigation system 100 in an embodiment of the present invention. The navigation system 100 includes a position detector 1, a map data input unit 6, operation switches 7, an external memory 9, a display 10, a speaker 11, a remote controller sensor 12, a remote controller 13, a camera 14 and a control circuit 8. The above-described components will be further described in detail.

The position detector 1 includes a plurality of well-known type sensors such as a geomagnetism sensor 2, a gyroscope 3, a distance sensor 4, and a Global Positioning System (GPS) receiver 5. These sensors are complementarily used for inter-active compensation of errors of respectively different natures. These sensors may selectively be used based on the accuracy of the output, and a steering rotation sensor, a speed sensor or the like (not shown in the figure) may additionally be utilized.

The map data input unit 6 is used to input map data such as road network data, index data, background drawing data or the like into the navigation system 100 under instructions from the control circuit 8. These data are provided in various kinds of memory medium such as a CD-ROM, a DVD-ROM as well as a writable medium such as a memory card, a hard disk or the like.

Next, links and nodes in the road network data are described. Links and nodes are defined as a geometrical element with two points attached on both ends of the element, and the node corresponds to a crossing, a branch point or the like of a road. Roads in a real world are geometrically represented as a combination of the links and nodes in map data. Link data of each road includes a link ID, a link length, coordinates (e.g., latitude and longitude) of nodes on both ends, i.e., a start point and an end point, a road name, a road type (interstate, state road, local road, or the like), a road width, the number of lanes including the number of right/left turn lanes, a speed limit and the like.

Node data of each node includes a node ID, node coordinates (e.g., latitude and longitude), a node name, connecting link IDs for designating all of the links that share the node as an end point, and a node attribute that designates a node type such as an intersection, a branch point or the like.

The operation switches 7 are, for example, disposed as touch switches or mechanical switches on the display 10, and are used for inputting various kinds of instructions. The instruction may include a start point setting instruction, a destination setting instruction, or the like.

The external memory 9 is a memory medium of read/write capability for storing/retrieving information. The memory 6 stores map data or the like that is used for process in the navigation system 100.

The display 10 is, for example, a liquid crystal display or the like, and displays a position mark at a current position of the vehicle derived from the position detector 1 on a map that is generated by using the map data inputted from the map data input unit 6.

The speaker 11 outputs guidance voice for navigating a user or a driver of the vehicle or the like.

The remote controller sensor 12 and the multi-purpose remote controller 13 are used in combination to input various instructions such as a start/end instruction of navigation or the like into the navigation system 100. The instructions may alternatively be input by using the operation switches 7.

The camera 14 is disposed on, for example, a front portion of the vehicle, and captures an image of the road on which the vehicle is traveling under control of the control circuit 8 at a predetermined interval. The traveling condition of the vehicle such as passing an intersection, going out of the road or the like is determined based on the image captured by the camera 14.

The control circuit 8 is a computer of well-known type, and includes a CPU, a ROM, a RAM, an I/O and a bus line for interconnection between these devices (not shown in the figure). The ROM stores a program that is executed by the control circuit 8 in the navigation system 100. The program in the ROM controls processes executed in the CPU or in other devices. For example, an optimum route to a destination is searched and determined upon receiving an input of the destination from the user based on the ma data, and navigation instructions toward the destination is provided accordingly. The control circuit 8 determines a location of the vehicle on the map based on an estimated current position of the vehicle derived from the position detector 1 by using map matching process in the map data. The accuracy of the map matching process is improved by employing the road image from the camera 14. That is, the traveling condition of the vehicle based on the road image is taken into consideration in the map matching process. The program executed in the control circuit 8 may be retrieved from outside of the navigation system by using the external memory 9.

Figure 2:
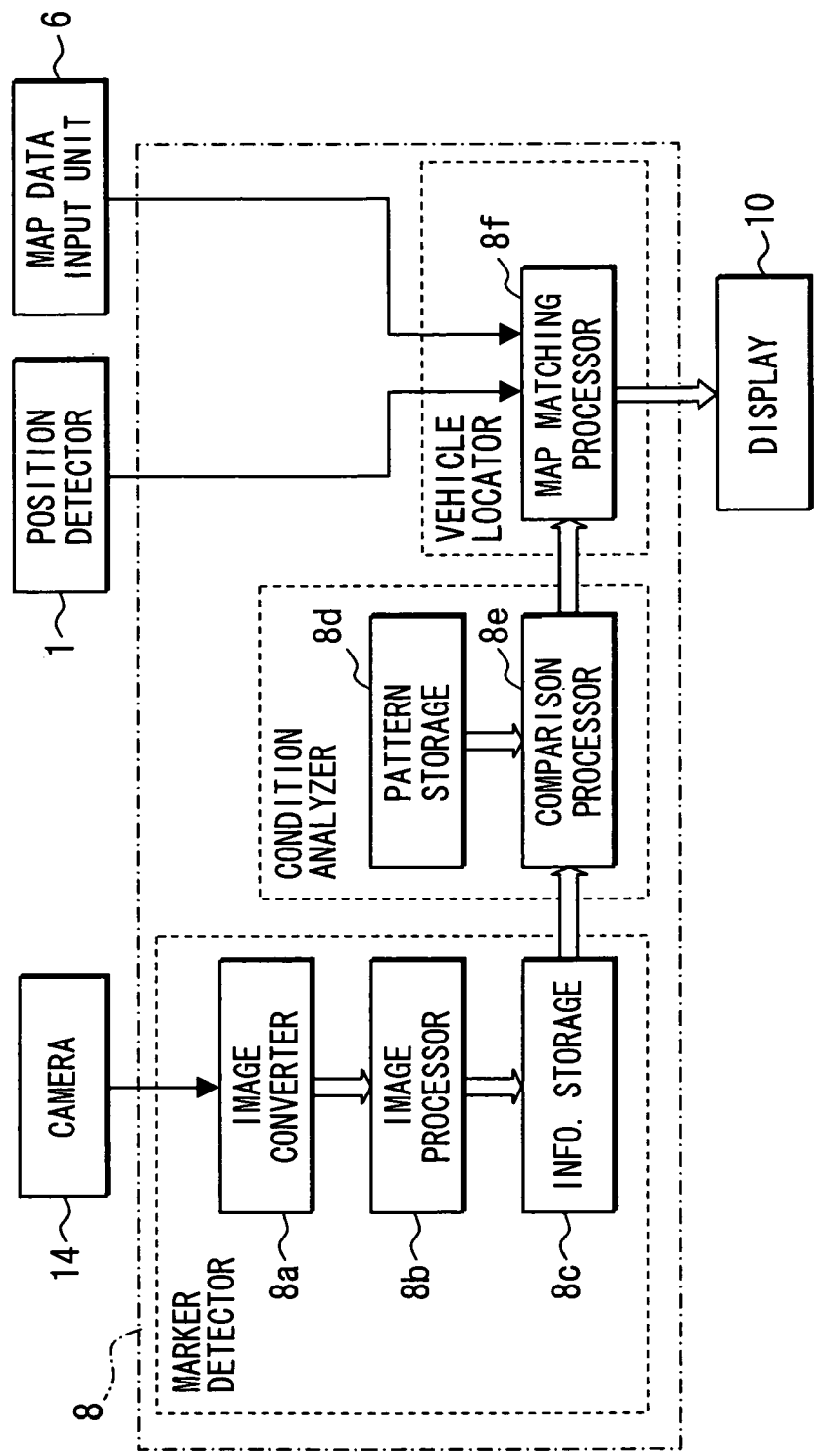
FIG. 2 shows a block diagram of traveling condition determination process in a control circuit in the embodiment.

The traveling condition determination process and the map matching process in the control circuit 8 are described with reference to FIG. 2. In FIG. 2, the processes in the control circuit 8 are divided into several blocks for further explanation. That is, the control circuit 8 includes a marker detector, a condition analyzer, and a vehicle locator. The marker detector is further divided into an image converter 8a, an image processor 8b and an information storage 8c. The condition analyzer is divided into a pattern storage 8d and a comparison processor 8e. The vehicle locator includes a map matching processor 8f.

Determination of the traveling condition of the vehicle by employing those processors and/or data storage is outlined in the following description. That is, the marker detector detects a white line marker on the road while the vehicle is traveling on the road, and the vehicle body angle against the marker is calculated and stored in the memory as the vehicle travels along the road. Then, angle transition of the traveling vehicle is analyzed by the condition analyzer in terms of comparative matching to stored travel patterns. The traveling condition of the vehicle is determined based on matching results, and the map matching processor 8f in the vehicle locator employs the determined travel condition for map matching.

Figure 3:
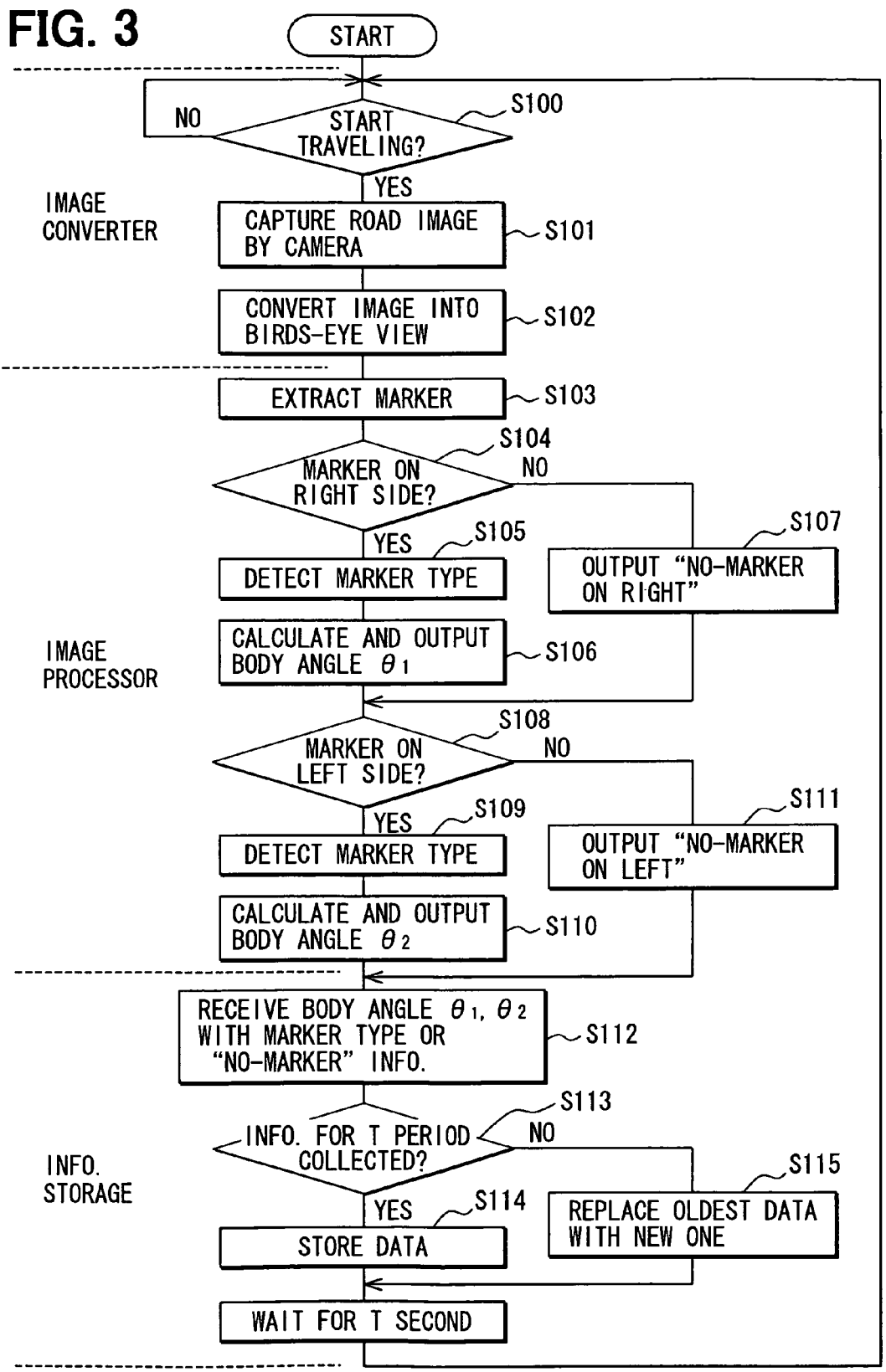
FIG. 3 shows a flowchart of a process for recognizing a marker in the control circuit.
Figure 4:
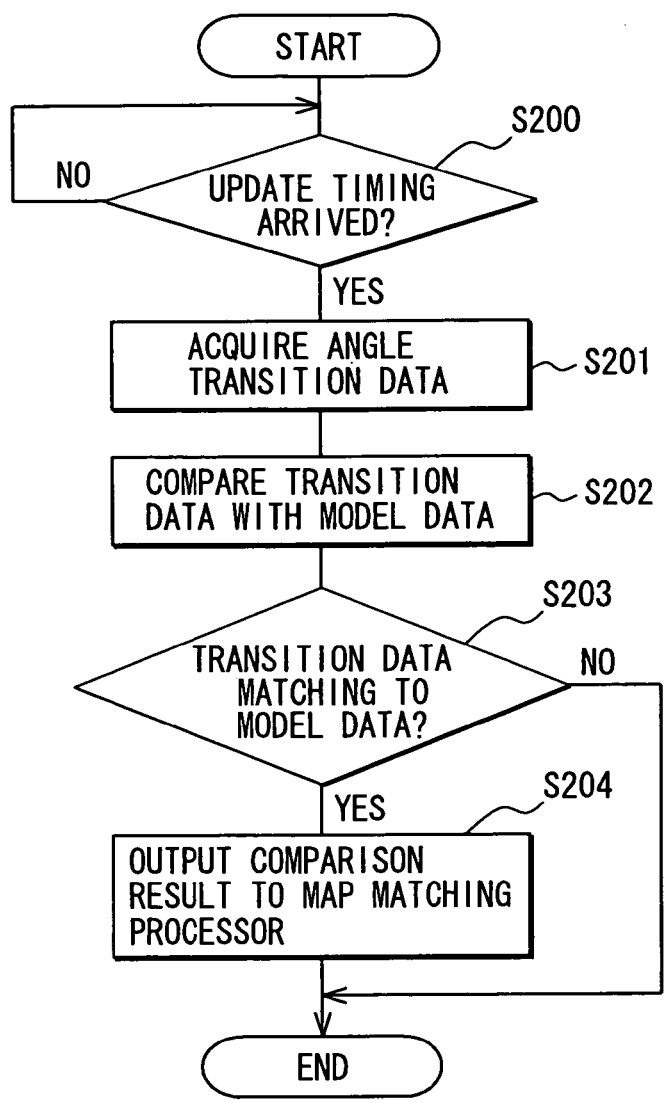
FIG. 4 shows a flowchart of a process for analyzing a traveling condition in the control circuit.
Figure 5:
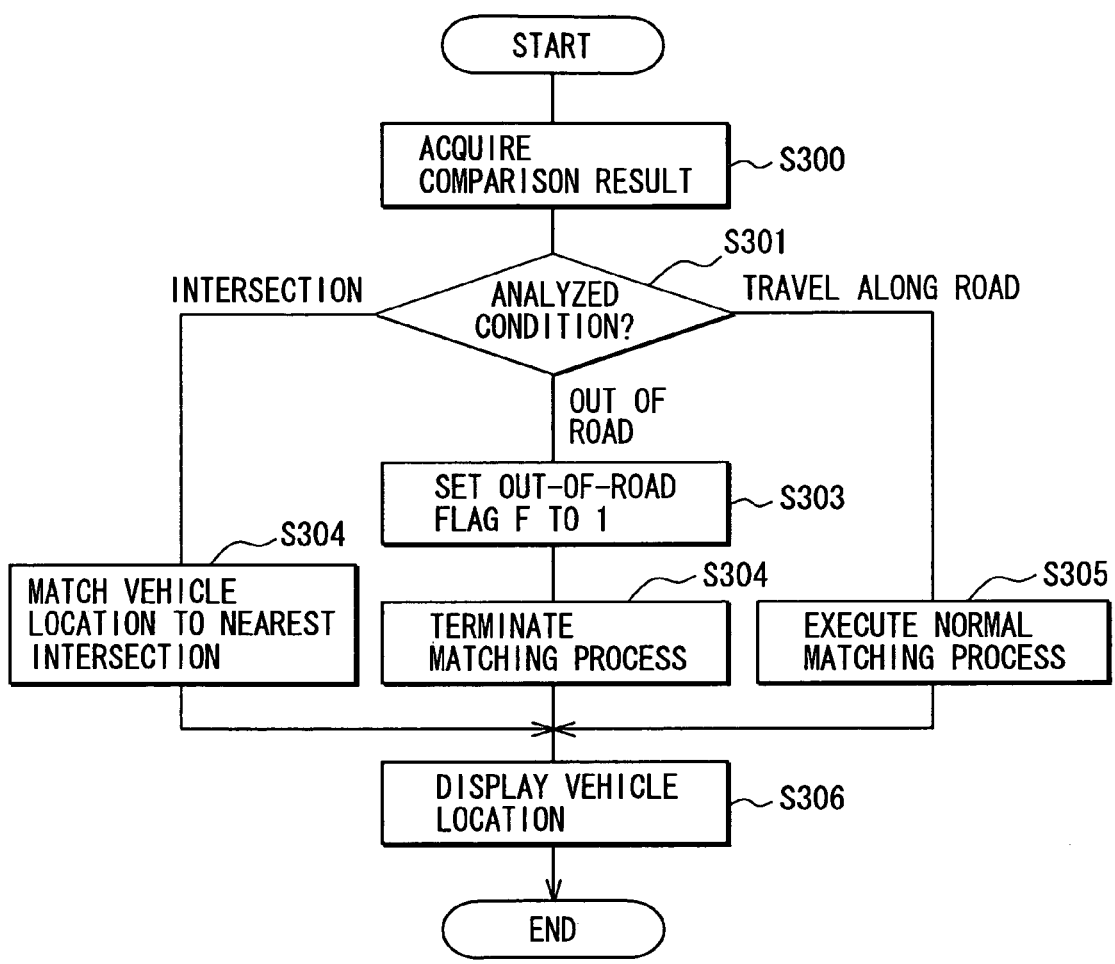
FIG. 5 shows a flowchart of a process for determining a location of a vehicle in the control circuit.

Processes for traveling condition determination in the marker detector, the condition analyzer and the vehicle locator are explained respectively in FIGS. 3, 4 and 5 by using flowcharts.

FIG. 3 shows a flowchart of a process in the marker detector.

In step S100, the process determines whether the vehicle has started traveling on the road. The following process will not be executed while the vehicle is stopping, because the process of traveling condition determination in the control circuit 8 uses transition of detected body angle relative to the marker line. That means, the process in the stopping vehicle does not have a body angle transition input, thereby providing no traveling condition determination while the vehicle is stopping. The process proceeds to step S101 when the vehicle starts traveling on the road.

Figure 6A:
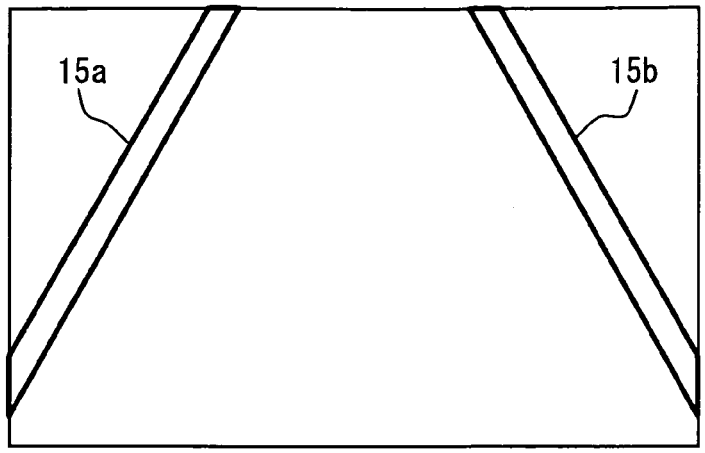
FIG. 6A shows an image captured by a camera in the navigation system.

In step S101, the image converter 8a receives an image of the road captured by the camera 14. FIG. 6A shows an example of the image captured by the camera 14. As shown in FIG. 6A, markers 15a, 15b on the road are captured in the image. That is, a position and an angle of the camera 14 is determined so that the markers 15a, 15b on the road are included in the image. Objects other than the markers 15a, 15b in the image in FIG. 6A are omitted for clarity of illustration. The process proceeds to step S102 after image reception.

Figure 6B:
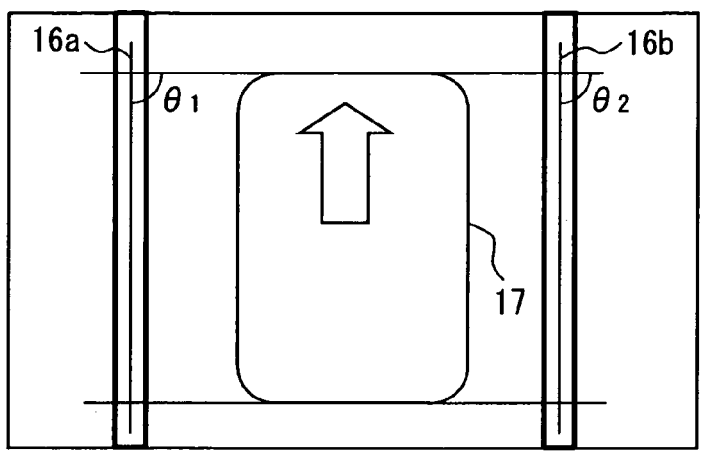
FIG. 6B shows an illustration of angle calculation based on the image captured by the camera.

In step S102, the process controls the image converter 8a to convert the received image into a birds-eye view. The image is converted so that the body angle relative to the marker can be easily calculated. FIG. 6B shows an illustration of angle calculation based on the captured image. In this illustration, the markers 15a, 15b in FIG. 6A are shown as lines 16a, 16b, and an outline of the body of the vehicle is shown as a rectangle 17. The body angles are calculated as angles θ1 and θ2 between a front line of the vehicle body and the lines 16a, 16b as shown in FIG. 6B. The process proceeds to step S103 after the conversion.

In step S103, the process controls the image processor 8b to extract the lines 16a, 16b in the converted image.

In step S104, the process controls the image processor to determine whether a marker exists on the right side of the road. In this case, the example in FIG. 6B shows that the line 16a representing the marker 15a exists on the right side of the road. The process proceeds to step S105 when the marker is determined to be on the right side of the vehicle. The process proceeds to step S107 when there is no marker on the right side of the vehicle.

In step S105, a type of the marker is detected. That is, the process determines whether the marker is a solid line or a broken line. The marker type is used to determine what lane in a multi-lane road the vehicle is traveling. The process proceeds to step S106 after marker type determination.

In step S106, the process calculates the body angle $\theta1$ relative to the line 16a. The body angle $\theta1$ is determined in the following manner. First, the extensions of a front and rear sides of the vehicle body (the rectangle 17) crossing the marker line 15a are used to define two points on the straight line 16a. That is, the direction of the line 16a is defined by the two crossing points. Then, the body angle $\theta1$ is defined as the angle between the front side of the vehicle and the line 16a. The body angle $\theta1$ and the marker type (the solid line or the broken line) are outputted to the information storage 8c.

On the other hand, in step S107, the process outputs the information that there is no marker on the right side to the information storage 8c.

In steps S108 to S110, the process determines whether the marker exists on the left side of the vehicle. That is, the marker on the left side of the vehicle is detected in step S108, the type of the marker is determined in step S109, and the body angle $\theta2$ and the marker type is outputted to the information storage 8c after calculation in step S110. The no marker on the left side information is outputted to the information storage 8c in step S111.

In step S112, the process controls the information storage 8c to receive the body angles $\theta1$, $\theta2$ and the marker type from the information processor 8b.

In step S113, the process determines whether the information regarding the body angles $\theta1$, $\theta2$ for a predetermined number of cycles T is stored in the storage 8c. The process proceeds to step S114 when the information does not cover the predetermined number of cycles T for further collection of information. The process proceeds to step S115 when the collected information covers the body angles $\theta1$, $\theta2$ for the predetermined number of cycles T.

In step S114, the process stores the body angle information associated with a current time. The process proceeds to step S116 after storing the information.

In step S115, the process replaces the oldest information in the storage 8c with a newly acquired information from the image processor 8b. The process proceeds to step S116 after replacing the information.

Figure 7:
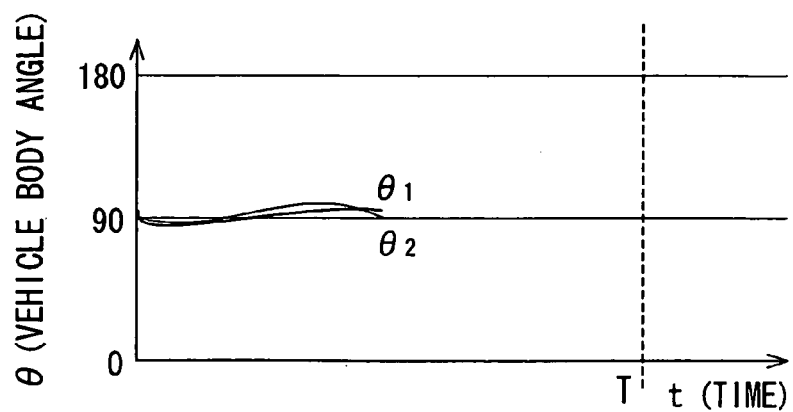
FIG. 7 shows a diagram of angles between a vehicle body and the marker over a period of time.

In step S116, a time is started to count a predetermined period t before returning to step S100. That is, the process shown in the flowchart in FIG. 3 repeats itself at an interval of t while the vehicle is traveling. As a result of execution of the process in FIG. 3, information on the transition of the body angles $\theta1$, $\theta2$ relative to the markers is collected in the information storage 8c as shown in a diagram in FIG. 7. The body angle transition information is accompanied by the marker types, i.e., a solid/broken line determined in steps S105 and S109.

The condition analyzer having the pattern storage 8d and the comparison processor 8e analyzes the body angle information for determining the traveling condition of the vehicle. The analysis process is shown as a flowchart shown in FIG. 4.

In step S200, the process controls the comparison processor 8e to determine whether a current position update timing has arrived. The current position update timing indicates a time when the map matching processor 8e (described later) updates the location of the vehicle based on a signal from the position detector 1. The process of the condition analysis proceeds to step S201 when the update timing arrives. The condition analysis in synchronization with the map matching enables the analyzed traveling condition of the vehicle to be reflected on the map matching result.

In step S201, the process controls the comparison processor 8e to acquire angle transition data regarding the body angles $\theta1$, $\theta2$ stored in the information storage 8c.

In step S202, the process controls the comparison processor 8e to compared the acquired transition data with models stored in the pattern storage 8d. That is, the traveling condition is determined based on pattern matching of the acquired angle transition data with the stored traveling pattern models in the pattern storage 8d. In this case, for example, the pattern models shown in FIGS. 8A, 9A, 10A and 11A are stored in the pattern storage 8d.

Figure 8A:
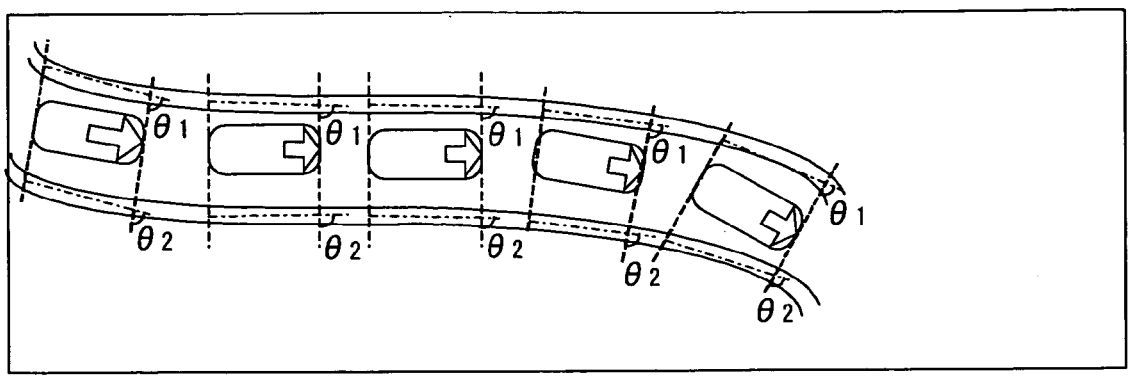
FIG. 8A shows an illustration of relationship between the marker and the vehicle when the vehicle is traveling along a road.
Figure 8B:
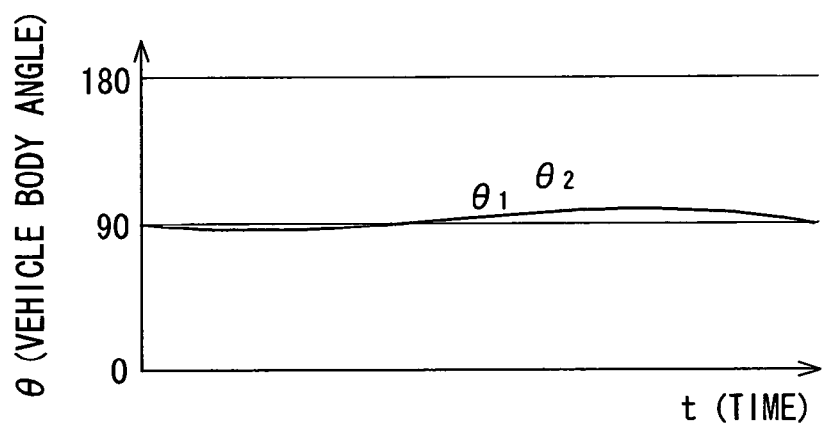
FIG. 8B shows a diagram of angles between the marker and the vehicle when the vehicle is traveling along the road.

The pattern model in the illustration in FIG. 8A shows that the vehicle is traveling along the road. In this case, the vehicle traveling along the road runs substantially parallel with marker lines on the road. Therefore, the body angles $\theta1$, $\theta2$ stays just above and below 90 degrees in the transition as shown in a diagram in FIG. 8B.

Figure 9A:
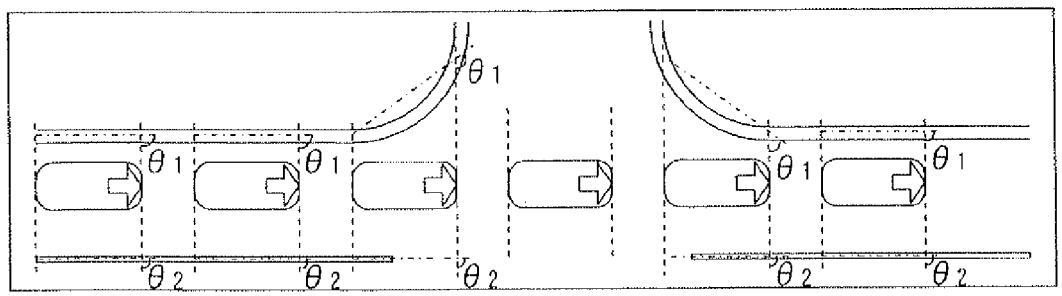
FIG. 9A shows an illustration of relationship between the marker and the vehicle when the vehicle is passing straight through an intersection.
Figure 9B:
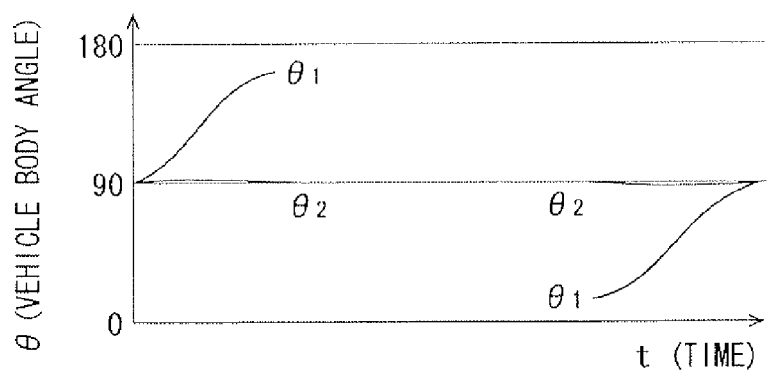
FIG. 9B shows a diagram of angles between the marker and the vehicle when the vehicle is passing straight through the intersection.

The pattern model in the illustration FIG. 9A shows that the vehicle is passing straight through an intersection. In this case, the vehicle traveling through the intersection has an increasing body angle $\theta1$ relative to the marker line on the right side with a substantially constant body angle $\theta2$ relative to a center line marker of the road while the vehicle is entering into the intersection. That is, the body angle $\theta1$ increases from 90 degrees as the vehicle enters into the intersection, while the body angle $\theta2$ stays with 90 degrees as shown in FIG. 9B. The transition of the body angles $\theta1$, $\theta2$ reverses when the vehicle leaves the intersection as shown in a diagram in FIG. 9B. The transition pattern of the body angles $\theta1$, $\theta2$ has an interruption because the vehicle traveling in the middle of the intersection does not have the markers on the sides.

Figure 10A:
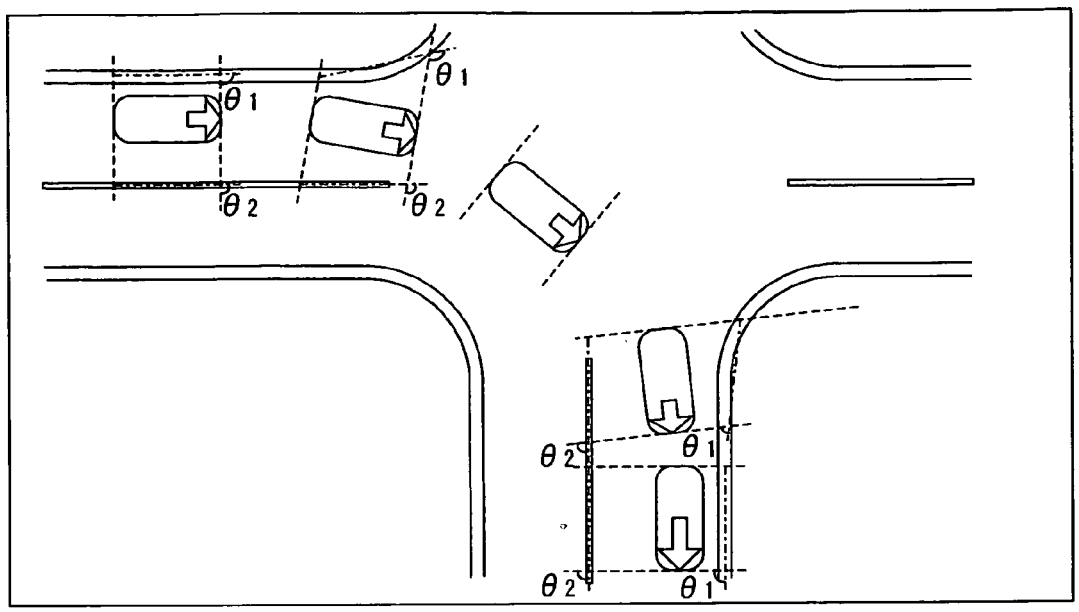
FIG. 10A shows an illustration of relationship between the marker and the vehicle when the vehicle is turning right in an intersection.
Figure 10B:
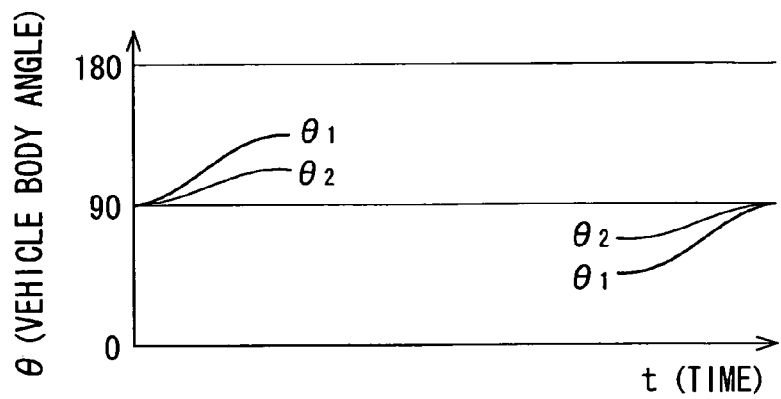
FIG. 10B shows a diagram of angles between the marker and the vehicle when the vehicle is turning right in the intersection.

The pattern model in the illustration FIG. 10A shows that the vehicle is turning left in the intersection. In this case, the vehicle turning left at the intersection has an increasing body angle $\theta1$ relative to the marker on the right side of the vehicle. The body angle $\theta1$ steeply increases when the body angle $\theta2$ relative to the center line marker also gradually increases from 90 degrees in the left turn in the intersection as shown in FIG. 10B. The increase of the body angle $\theta2$ is smaller than the increase of the body angle $\theta1$. The transition pattern of the body angle in the left turn has interruption as in the straight travel through the intersection. The transition of the body angles $\theta1$, $\theta2$ resume as the vehicle proceeds in the left turn. The body angles $\theta1$, $\theta2$ in the resumed transition starts at an angle smaller than 90 degrees, and the body angles $\theta1$, $\theta2$ approach toward 90 degrees as shown in a diagram in FIG. 10B.

Figure 11A:
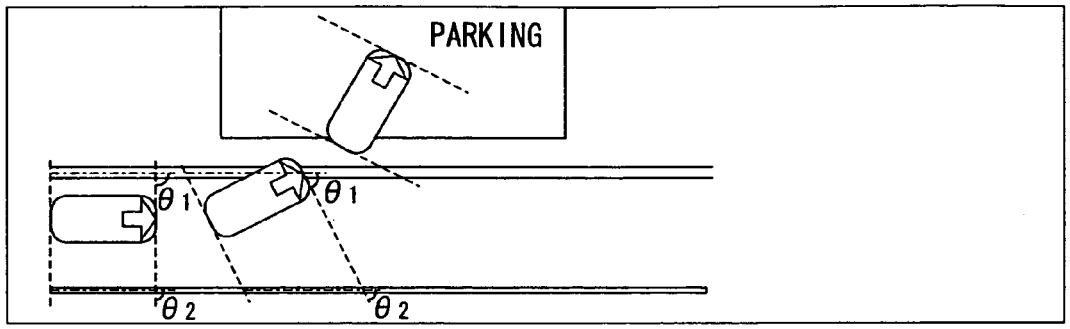
FIG. 11A shows an illustration of relationship between the marker and the vehicle when the vehicle is going out of the road into a parking lot.
Figure 11B:
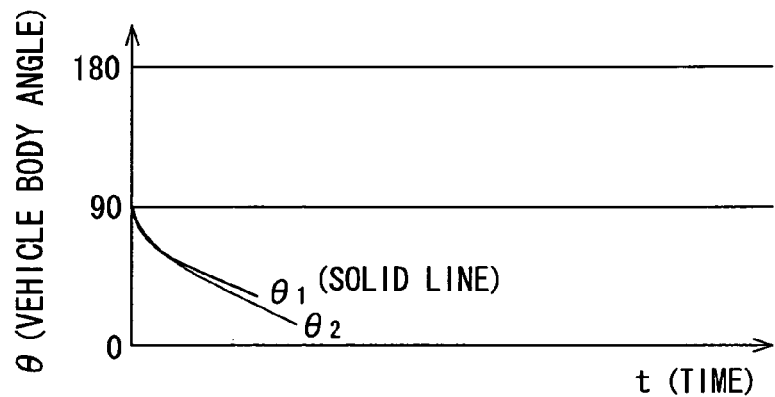
FIG. 11B shows a diagram of angles between the marker and the vehicle when the vehicle is going out of the road into the parking lot.

The pattern model in the illustration FIG. 11A shows that the vehicle is going out of the road into, for example, a parking lot. In this case, the vehicle turning right into the parking lot. The body angles $\theta1$, $\theta2$ decrease at the same pace as the vehicle goes in the parking lot as shown in a diagram in FIG. 11B. The transition of the body angles $\theta1$, $\theta2$ terminates when the vehicle further proceeds in the parking lot. The transition of the body angle $\theta1$ relative to the right side marker terminates first, and termination of the transition of the body angle $\theta2$ relative to the left side marker follows.

The transition pattern of the body angles $\theta1$, $\theta2$ in a lane change from a left lane to a right lane in a traffic has the same pattern as the transition pattern of going out of the road in a beginning of the transition. Therefore, the transition pattern in the lane change is distinguished from the transition pattern of going out of the road by using the marker type. That is, the marker line on the right side in the lane change from left to right is the broken line, while the marker line on the right side in the going out of the road is the solid line. On the other hand, the marker line on the left side of the vehicle may be both of the solid line and the broken line. Therefore, the transition data of the body angle $\theta1$ is associated with the marker type, and the transition data of the body angle $\theta2$ is not associated with the marker type. The transition data in other traveling condition is associated with the marker type depending on individual situations. In this manner, the traveling condition along the road having multiple lanes can be, for example, distinguished respectively for each of the multiple lanes by using the marker type.

The pattern storage 8d stores pattern models for traveling conditions other than the conditions described above. That is, for example, the traveling condition of turning right in the intersection is stored in the storage 8d.

Description of the flowchart resumes here from step S202, and the process controls the comparison processor 8e to compare the transition data with the model data for traveling condition determination. For example, the transition pattern of the increasing body angle θ1 from 90 degrees with the constant transition of the body angle θ2 around 90 degrees is regarded as a matching pattern of the traveling vehicle that goes straight through the intersection as shown in FIG. 9A.

In step S203, the process controls the comparison processor 8e to determine whether there is a pattern model that can be used as a reference model of the acquired transition pattern. The process proceeds to step S204 when there is a matching pattern as the reference model of the traveling condition. The process concludes after step S203 by skipping step S204 when there is no matching pattern. The traveling condition with no matching pattern indicates that the vehicle is traveling on the road with no marker line.

In step S204, the process controls the comparison processor 8e to output the comparison result to the map matching processor 8f. That is, the matching pattern of the traveling condition of the vehicle is sent to the map matching processor 8f as a traveling condition determination information.

The process controls the map matching processor 8f to determine the location of the vehicle by matching the estimated current position of the vehicle from the position detector 1 with the map data from the map data input unit 6. The map matching process in the map matching processor 8f is assisted by the information on the traveling condition of the vehicle outputted from the comparison processor 8e. More practically, the process of the map matching is described in the following with reference to a flowchart in FIG. 5.

In step S300, the process controls the map matching processor 8f to acquire the traveling condition from the comparison processor 8e. The process proceeds to step S301 after acquisition of the traveling condition (the comparison result).

Figure 12A:
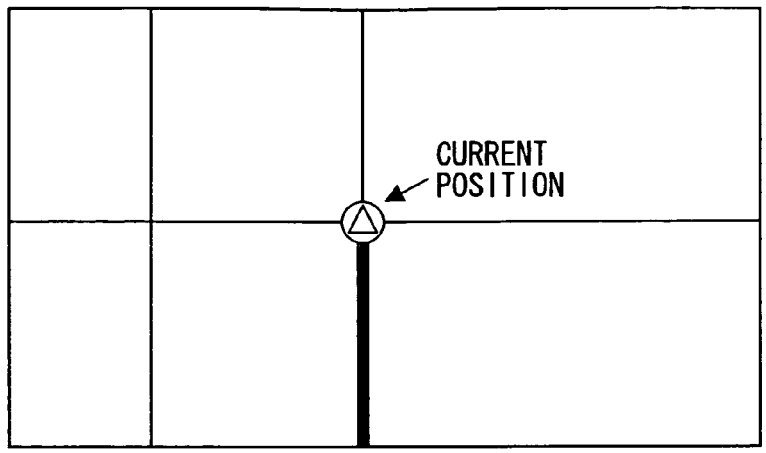
FIG. 12A shows an illustration of map matching result when the vehicle is passing the intersection.

In step S301, the process controls the map matching processor 8f to examine the comparison result. The traveling condition is determined as one of "Passing through an intersection (Straight, Right Turn, Left Turn)," "Going out of the road," "Traveling along the road," and "Not determined." The process proceeds to step S302 when the comparison result indicates that the vehicle is traveling through the intersection. The location of the vehicle is matched with the location of the nearest intersection in step S302 based on the estimated current position of the vehicle derived from the position detector 1. The process proceeds to step S306 to display a position mark on the map in the display 10 as shown in FIG. 12A after map matching in step S302.

The comparison result indicating that the vehicle is out of the road makes the process proceed to step S303.

Figure 12B:
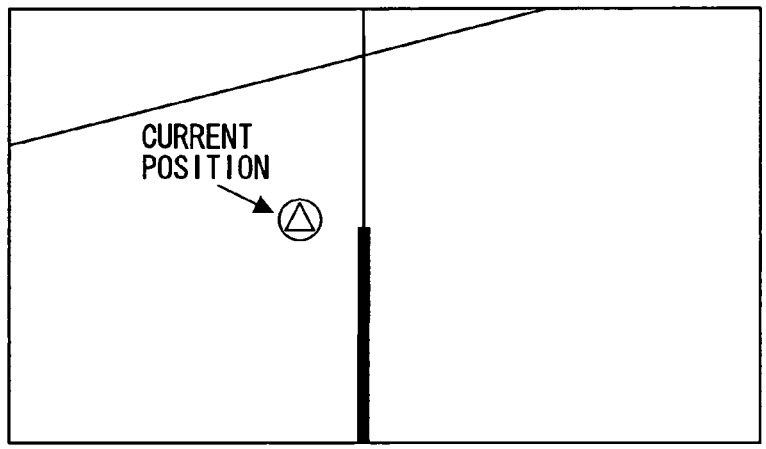
FIG. 12B shows an illustration of map matching result when the vehicle is going out of the road.

In step S303, the process sets an out-of-road flag F to 1 for memorizing the vehicle state. That is, the out-of-road flag has the value of 1 when the vehicle is out of the road in the parking lot or the like. The flag is set to the value of 0 when the vehicle returns to the road. The process proceeds to step S304 for terminating the map matching after setting the flag F. Then, the location of the vehicle is displayed on the map as shown in FIG. 12B in step S306. The location of the vehicle is shown without map matching based on the estimated current position derived from the position detector 1 while the flag F is set to 1. The flag F may be set to 0 when the traveling condition determined by the comparison processor 8e in the condition analyzer indicates that the vehicle is either traveling through the intersection or traveling along the road. The flag F may also be set to 0 based on transition pattern matching by preparing and using a transition pattern data for returning to the road.

Figure 12C:
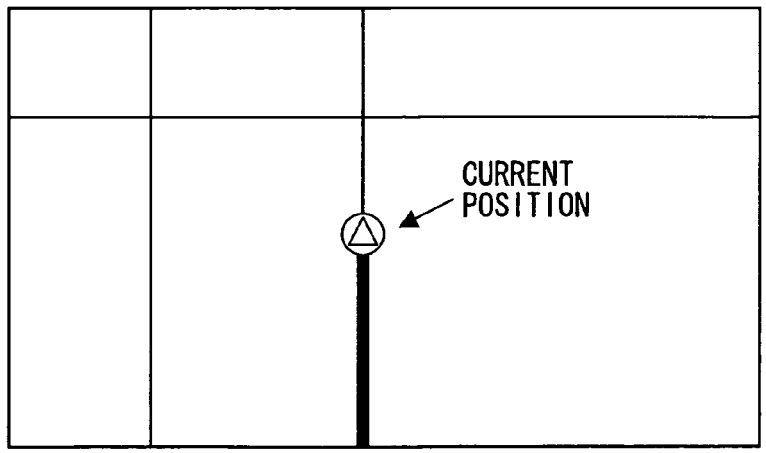
FIG. 12C shows an illustration of map matching result when the vehicle is traveling along the road.

The process proceeds to step S305 when the comparison result in step S301 indicates that the vehicle is traveling along the road or that the comparison does not determine the traveling condition. In this case, the estimated current position of the vehicle derived from the position detector 1 is matched to the road on the map as shown in FIG. 12C. The process proceeds to step S306 for displaying the location of the vehicle on the map. The location of the vehicle is matched to the road by map matching when the traveling condition of the vehicle is determined as "traveling along the road," because the accuracy of the vehicle location on the map in the navigation system 100 is not affected by execution of the normal map matching.

The navigation system 100 in the present embodiment determines the traveling condition of the vehicle based on the transition of the detected angle between the vehicle body and the marker on the road. In this manner, accurate location of the vehicle on the map can be determined by the navigation system 100 because of the precisely determined traveling condition reflected on the map matching process.

Although the present invention has been fully described in connection with the preferred embodiment thereof with reference to the accompanying drawings, it is to be noted that various changes and modifications will become apparent to those skilled in the art.

Figure 13:
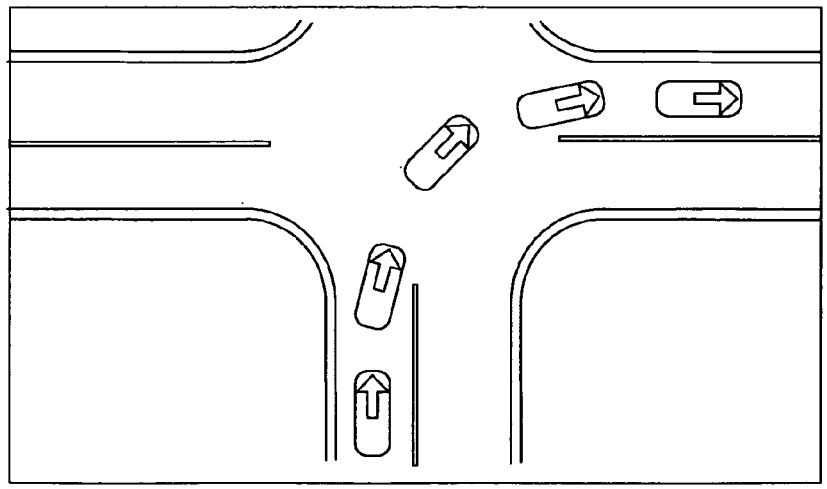
FIG. 13 shows an illustration graphic of the vehicle that is turning right in the intersection.

For example, location display on the map in the display of the navigation system may be changed depending on the traveling condition. That is, the right turn illustration in FIG. 13 may be flipped when the traveling condition of the vehicle is determined as "Turning left." In this manner, the traveling condition of the vehicle is realistically represented by the illustration graphic.

Further, the traveling condition determined by the traveling condition determination device may be used for, for example, provision of navigation guidance. That is, when the vehicle is determined to be traveling in the lane that leads to a left turn only lane, the navigation system may provide a warning for the driver that lane transition is required for straight travel through the approaching intersection.

Furthermore, traveling condition determination in synchronization with update timing of the vehicle location may be changed depending on the situation. For example, the traveling condition may be determined around a critical point of navigation such as a turning point in the navigation route, a proximity of the destination or the like. In this manner, process load of the navigation system may be decreased.

Furthermore, the amount of the traveling condition determination interval may be changed depending on the situation. For example, in a road having very few intersections, the amount of the interval may be increased, or the interval may be decreased in a vehicle traveling on a curvy road at slow pace. In this manner, the process load of the navigation system may be decreased and saved for other processes.

Furthermore, a graphic pattern on the road other than the line markers may taken into consideration for the traveling condition determination. For example, a left turn arrows in an exclusive left-turn lane in the middle of the road may be analyzed for traveling condition determination. In addition, color of the marker may be considered for determination. For example, the pavement markers drawn by using yellow paint may be recognized for determination.

Furthermore, the vehicle body angle may be detected and calculated in a different manner other than the angles θ1, θ2 used in the embodiment.

Furthermore, the map matching process may employ intersection passing condition for the map matching process after passing the intersection. For example, the traveling condition of "Turning left at an intersection" determined by the traveling condition determination device may be used for matching the vehicle location to be on a road extending toward left from the intersection in the map matching process after turning the intersection. In this manner, the accuracy of the map matching after turning the intersection may be improved.

Such changes and modifications are to be understood as being within the scope of the present invention as defined by the appended claims.

What is claimed is:

1. A traveling condition determination device for use in a vehicle, the device comprising:
    an imaging unit configured to periodically capture an image of a road on which the vehicle is traveling;
    a recognition unit configured to recognize, in the image periodically captured by the imaging unit, a marker on a side of the road relative to the vehicle;
    a detection unit configured to detect an angle of the vehicle relative to an arrangement of the marker recognized by the recognition unit;
    a storage unit configured to store a transition of the angle of the vehicle detected by the detection unit over a period of time;
    a pattern memory unit configured to store pattern models of angle transitions that correspond to traveling conditions, and
    a determination unit configured to determine a traveling condition of the vehicle based on a comparison between the transition of the angle stored in the storage unit and the pattern models stored in the pattern memory unit.

2. The traveling condition determination device as in claim 1, wherein
    the pattern memory unit stores a pattern model that corresponds to a traveling condition of straight travel of the vehicle along a road without turning.

3. The traveling condition determination device as in claim 1, wherein
    the pattern memory unit stores a pattern model that corresponds to a traveling condition of going-out-of-the-road travel of the vehicle.

4. The traveling condition determination device as in claim 1, wherein
    the pattern memory unit stores pattern models that correspond to traveling conditions including a straight passing through of the vehicle in an intersection, a right turning of the vehicle in an intersection, and a left turning of the vehicle in an intersection.

5. The traveling condition determination device as in claim 1, wherein
    the storage unit stores a marker attribute that associates the marker recognized by the recognition unit to one of a solid line marker and a broken line marker, and
    the pattern memory unit stores pattern models according to the marker attribute.

6. The traveling condition determination device as in claim 5, wherein
    the determination unit determines a traveling condition of the vehicle as traveling in a specific lane on the road based on a pattern model stored according to the marker attribute.

7. A navigation system for use in a vehicle having the traveling condition determination device as in claim 1, the system comprising:
    a position detector configured to detect an estimated current position of the vehicle;
    a map data storage unit configured to store map data;
    a map matching unit configured to determine a location of the vehicle based on matching of the estimated current position of the vehicle with a road on the map data, and
    a display unit configured to display the location of the vehicle in the map data, wherein
        the map matching unit takes the traveling condition of the vehicle determined by the determination unit into consideration in a process of map matching,
        the map matching unit interrupts the process of map matching when the traveling condition of the vehicle determined by the determination unit is that the vehicle is out of the road, and
        the display unit displays the estimated current position of the vehicle in the map data when the process of map matching is interrupted.

* * * * *